US005112678A

United States Patent [19]
Gay et al.

[11] Patent Number: 5,112,678
[45] Date of Patent: May 12, 1992

[54] METHOD AND COMPOSITION FOR COATING MAT AND ARTICLES PRODUCED THEREWITH

[75] Inventors: William M. Gay; Robert H. Blanpied, both of Meridian; Philip W. Bush, Laurel; Richard L. Donald; James L. Williams, both of Meridian; James H. Williams, Little Rock, all of Miss.

[73] Assignee: Atlas Roofing Corporation, Meridian, Miss.

[21] Appl. No.: 616,593

[22] Filed: Nov. 21, 1990

Related U.S. Application Data

[63] Continuation-in-part of Ser. No. 568,705, Aug. 17, 1990, Pat. No. 5,001,005.

[51] Int. Cl.[5] B32B 3/26; B32B 17/02; B32B 5/16

[52] U.S. Cl. 428/268; 427/372.2; 427/389.8; 428/273; 428/283; 428/290; 428/304.4

[58] Field of Search 427/372.2, 389.8; 428/268, 273, 283, 290, 304.4

[56] References Cited

U.S. PATENT DOCUMENTS 4,459,334 7/1984 Blanpied et al. 428/285
4,618,522 10/1986 Modic 428/283

*Primary Examiner*—William J. Van Balen
*Attorney, Agent, or Firm*—Nixon & Vanderhye

[57] ABSTRACT

A method of producing a non-porous mat includes coating a predominantly glass fiber porous web substrate. The coating comprises an aqueous mixture of a mineral pigment; a first binder material comprised of a polymer latex adhesive material; and, a second binder material comprised of an inorganic adhesive material. On a dry weight basis, the first binder material comprises no more than 5.0% by weight, and the second binder material at least 0.5% by weight, of the total weight of the coating. The second binder preferably comprises an inorganic compound such as calcium oxide, calcium silicate, calcium sulfate, magnesium oxychloride, magnesium oxysulfate, or aluminum hydroxide. In one mode, the second binder is included in the mineral pigment, as in the cases wherein the mineral pigment includes aluminum trihydrate, calcium carbonate, calcium sulfate, magnesium oxide, and some clays and sands. A method of using the coated mat to produce a thermosetting plastic foam laminate panel is also disclosed.

23 Claims, 1 Drawing Sheet 10
14
20
18
12
16
20
18

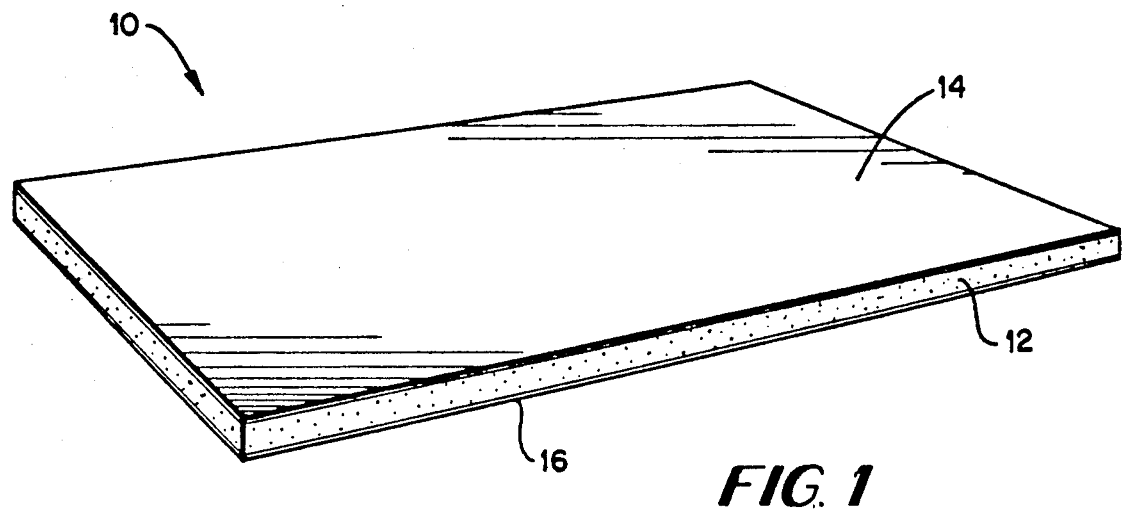
FIG. 1
FIG. 2
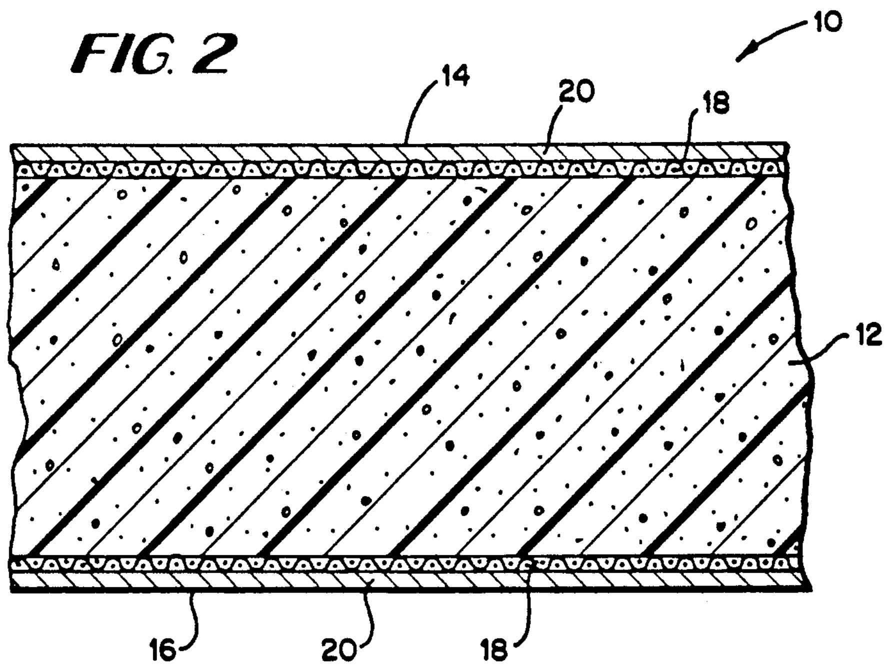

METHOD AND COMPOSITION FOR COATING MAT AND ARTICLES PRODUCED THEREWITH

BACKGROUND

This application is a continuation-in-part application of U.S. Patent application Ser. No. 07/568,705, filed Aug. 17, 1990, now U.S. Pat. No. 5,001,005 .

1. Field of Invention

This invention pertains to a novel process for coating a porous, substantially glass fiber mat so that the resultant mat can be used as an underlayment or facer material for the building construction industry, as well as to the coating composition, the resultant coated mat, and laminates made with the coated resultant mat.

2. Prior Art and Other Considerations

Many forms of weather resistant webbed sheets have been developed for the building construction industry for installation as an "underlayment" under shingles or siding. Examples of such webbed sheets, also called "construction paper", range from the old original "tar paper", up to the spun-bonded polyolefin house wraps of the present day.

Various types of webbed sheets have also been used as a "facer" material for foamed insulation board laminates, with the laminates ultimately being utilized as side-wall or roofing insulation.

To be effectual for their purposes, the underlayment and facers produced from webbed sheets must satisfy the dual criteria of (1) maintaining dimensional stability as a part of weather resistance in the varied outdoor climates of the world; and, (2) having a high degree of resistance to penetration by liquids, including both organic liquid and water.

Most of the prior art construction paper materials have been made using a cellulosic felt or Kraft paper which has been treated with either coal tar pitch, asphalt, or pine rosin. The natural tendency of cellulose to swell and expand when wet, and then shrink when dried, has presented a problem in maintaining flatness of these webbed sheets. With the advent of light weight siding and shingles, a curled, wavy, or wrinkled underlayment sheet is unacceptable.

Similar cellulosic products have been used as a facer in the process of making foamed laminate board insulation. The dimensional instability and fire safety hazards of these cellulosic products have rendered them unacceptable to many builders and fire officials.

In an effort to overcome dimensional instability and reduce the fire safety hazard, glass mats have been substituted for cellulose sheets as the base substrate. Liquid penetration resistance has been achieved either by incorporating glass micro-fibers, now thought to be unsafe, or by adding a coating layer.

Typically, glass mats have been saturated or coated with various asphaltic materials to reduce porosity. One example of an asphalt binder-based coating on a glass mat is disclosed in U.S. Pat. No. 4,186,236, and is sold by Manville Sales Corporation, Toledo, Ohio.

While asphaltic-coated glass mats have been suitable to some degree, such mats are expensive and flammable. In this latter regard, such mats when used on foam plastic insulation are unable to pass the Major Model Building Codes requirement to have a "75 or less Flame Spread Index" when tested in accordance with ASTM E-84.

Coatings in general, whether for glass mats or cellulosic materials, generally comprise a pigmented filler material and a latex binder. Historically, for materials to be sold and used as pigments for coatings, an effort has been made to purify the pigment, including attempted elimination of naturally occurring binders. Limestone and clay are examples of filler materials which are treated in order to minimize impurities such as naturally occurring binders. Such naturally occurring binders could cause the pigmented filler material to undesirably set up in large lumps during storage.

Heretofore it was thought that the dry weight ratio of filler pigments to the dry weight of the polymer latex in aqueous coating formulations could not exceed certain limits. If this ratio were too high, the pigment would no longer adhere to the early prior art substrates (e.g., cellulosic substrates) to which the coatings were applied. The term "whitewash" had been applied to a binderless coating, and has come to mean a "low quality cover-up". Higher levels of latex with filler have been shown to be longer lasting and more resistive to attacks, whether used in a house paint or a paper coating. High quality paints or paper coatings can use low weight ratios, such as a 3:1 ratio of pigment to latex. The median range is around from a 4:1 to an 8:1 ratio of filler to latex. The ratio depends on the type of filler and the type of binder as well as the intended end-use application. For example, a carpet backing is in a relatively mild environment where formulations are known to slightly exceed a 10:1 ratio of limestone:SBR latex.

Accordingly, prior art commercially-produced mats comprise fibers (whether glass, cellulose, or plastic), and have used a high percentage of polymer latex to bind mineral pigment fillers. Some have optionally used a special "solvent holdout" treatment. Examples of such a mat are those available through the Manning Division of Lydall, Inc., Troy, N.Y. known as Manniglass #1274, #1279, and #1286. This type of mat with the cellulose or plastic fibers, the high level of polymer latex binder, and the optional solvent treatment is quite flammable and expensive to produce.

The continual growth of foam panels used as insulation has developed an acute need for a webbed facer sheet which resists penetration of both organic liquids as well as water. Furthermore, the foam insulation panels must be dimensionally stable, economical, and must also meet the Building Codes requirement listed above. The webbed sheets used for such foam laminates must be resistant to organic polymer penetration in order to be successfully processed. They must also be weather resistant after applied in board form.

Examples of some foam insulation panels fulfilling the criteria of the previous paragraph are provided in U.S. Patent application Ser. No. 07/568,705, filed Aug. 17, 1990, entitled STRUCTURAL LAMINATES MADE WITH NOVEL FACING SHEETS, and incorporated herein by reference.

Accordingly, it is an object of the present invention to provide a dimensionally stable, liquid penetration resistant, coating composition for a webbed mat and a process for obtaining the same.

An advantage of the present invention is the provision of an economical and weather resistant coating composition and method for producing a webbed mat.

An advantage of the present invention is the provision of a reduced porosity, predominately glass fiber mat, void of micro-fibers or fibrous glass dust, which effectively reduces the penetration of both water and liquid polymeric plastic foam mixtures.

Another advantage of the present invention is the provision of a predominately glass fiber mat which provides a safety feature of reduced combustibility.

Yet another advantage of the present invention is that the novel coating material used to lower porosity, provides a mat which is smoother to the touch than a mat made of 100% glass.

A yet further advantage is that the novel binders and fillers provide an economical mat at the same time the porosity and the surface texture is improved.

SUMMARY

A method of producing a liquid impermeable mat includes coating a predominantly glass fiber porous web substrate. The coating comprises an aqueous mixture of a mineral pigment; a first binder material comprised of a polymer latex adhesive material; and, a second binder material comprised of an inorganic adhesive material. On a dry weight basis, the first binder material comprises no more than 5.0% by weight, and the second binder material at least 0.5% by weight, of the total weight of the coating. The second binder preferably comprises an inorganic compound such as calcium oxide, calcium silicate, calcium sulfate, magnesium oxychloride, magnesium oxysulfate, or aluminum hydroxide. In one mode, the second binder is included in the mineral pigment, as in the cases wherein the mineral pigment includes aluminum trihydrate, calcium carbonate, calcium sulfate, magnesium oxide, or some clays and sands. The coating method and composition permits the ratio by weight of the mineral pigment to said polymer latex adhesive material of said first binder to be in excess of 15:1. In one mode of the invention, a coating composition is substantially void of polymer latex adhesive material, with essentially the sole binder being inorganic adhesive material.

In addition, the invention encompasses a method of using the coated mat to produce a thermosetting plastic foam laminate panel.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 1 is an isometric view of a laminate prepared using a glass mat coated with a coating composition of an embodiment of the invention.

FIG. 2 is a cross-sectional view of the laminate of the embodiment of FIG. 1.

DETAILED DESCRIPTION OF THE INVENTION

The webbed mats of the present invention start with ordinary, but highly porous, glass fiber mats void of micro-glass fibers as the base substrate upon which a novel coating mixture is applied to create a liquid penetration resistant mat. In recent years "micro-glass" fibers were used in glass mats as an economical way to reduce the porosity of glass mat. These "micro-glass" fibers generally have a diameter of 10 microns or less and are usually less than 0.5 inches in length. But in recent years, scientists have classified micro-glass as a serious hazard to human safety. In this respect, in 1990 the American Conference of Governmental Industrial Hygienists (ACGIH) listed the Threshold Limit Value (TLV) of Fibrous Glass Dust to have a maximum Time Weighted Average (TWA) exposure of only 10 milligrams per cubic meter. It is thought by some that microglass dust may even ultimately be classified as a human carcinogen.

The coating method and composition of the present invention yields a liquid impermeable mat by coating a predominantly glass fiber porous web substrate. The coating mixture comprises an aqueous mixture of a mineral pigment; a first binder material comprised of a polymer latex adhesive material; and, a second binder material comprised of an inorganic adhesive material. On a dry weight basis, the first binder material comprises no more than 5.0% by weight, and the second binder material at least 0.5% by weight, of the total weight of the coating. The coating method and composition of the present invention permits the ratio by weight of the mineral pigment to the polymer latex adhesive material of the first binder to be in excess of 15:1 and in some cases in excess of 20:1. In fact, in one mode of the invention, a coating composition is substantially void of polymer latex adhesive material, with essentially the sole binder being inorganic adhesive material.

Examples of polymer latex binders used with the inorganic binders are, but are not limited to: Styrene-Butadiene-Rubber (SBR), Styrene-Butadiene-Styrene (SBS), Ethylene-Vinyl-Chloride (EVCl), Poly-Vinylidene-Chloride (PVdC), modified Poly-Vinyl-Chloride (PVC), Poly-Vinyl-Alcohol (PVOH), Ethylene-Vinyl-Actate (EVA), and Poly-Vinyl-Acetate (PVA). No asphalt is used as a binder in this invention.

Examples of the inorganic binders which are used with the latex binders in the coatings of this invention are, but are not limited to the following: calcium oxide, calcium silicate, calcium sulfate, magnesium oxychloride, magnesium oxysulfate, and other complexes of some Group IIA elements (alkaline earth metals), as well as aluminum hydroxide.

One example of such a complex inorganic binder is common portland cement, which is a mixture of various calcium-aluminum silicates. However, portland cement cures by hydration, which can create a coating mixture with a short shelf life. Also, both the oxychloride and the oxysulfate of magnesium are complex inorganic binders which cure by hydration. Such a coating must be used quickly or the tank could set up hard.

The oxychloride or oxysulfate of magnesium, aluminum hydroxide, and calcium silicate are only very slightly soluble in water, and are useful binders of this invention. Inorganic binders which are quickly soluble in water, such as sodium silicate, are presently not thought to be usable in hostile weather for long periods. The preferred inorganic binder of this invention is quicklime, which does not hydrate in a coating mix, but cures by slowly converting to limestone by adding carbon dioxide from the air, and thus is not soluble in water.

Examples of filler materials useful in the novel coating mixtures of this invention are, but are not limited to: ground limestone (calcium carbonate), clay, sand, mica, talc, gypsum (calcium sulfate), aluminum trihydrate (ATH), antimony oxide, or a combination of any two or more of these substances. To be an effective filler for a coating of this invention, the pigment should have a particle size such that at least 95% of the filler passes a 325 mesh wire screen. They are collectively and individually referred to as "fillers" throughout this invention.

Contrary to prior art coating practice, in one mode of the present invention filler materials containing some naturally occurring binder are deliberately chosen. These fillers with naturally occurring binders must, however, be of a suitable mesh size as prescribed above. Examples of such fillers listed with the naturally occurring binder are (but are not limited to) the following: Limestone containing quicklime (CaO), clay containing calcium silicate, sand containing calcium silicate, aluminum trihydrate containing aluminum hydroxide, and magnesium oxide containing either the sulfate or chloride of magnesium, or both. The filler, gypsum, is both a mineral pigment and a binder, but it is slightly soluble in water, and the solid form is crystalline making it a brittle and weak binder.

The fillers which include binders which cure by hydration are also advantageously flame suppressants. As examples, aluminum trihydrate (ATH), calcium sulfate (gypsum), and the oxychloride and oxysulfate of magnesium all carry molecules of water bound into their molecular structure. This water, referred to either as water of crystallization or water of hydration, is released upon sufficient heating, actually suppressing flames.

Thus, low cost inorganic mineral pigments such with the properties of those described in the preceding paragraph provide three (3) important contributions to the coating mixture: a filler; a binder; and, a fire suppressor.

While it is advantageous to have inorganic binder used in the present invention, there are practical upper limits to its use. Since the coated mat of this invention must be rolled up into reels of continuous webbed sheet, it cannot be so stiff and brittle that it will break upon bending. At the present time, it is thought that the inorganic binder content should not exceed about 20% by weight of the total dry weight of the coating. Likewise, the polymer latex binder has practical upper limits due to cost and combustibility. No more than about 5.0% latex (dry weight basis) of the total dry weight of the coating is necessary when used in accordance with the methods taught in this invention.

Typically, but not exclusively, the glass fiber mats used as the base substrate of this invention are wet-formed into a continuous non-woven web of any workable width on a Fourdrinier machine. Preferably, an upwardly inclining wire having several linear feet of very dilute stock lay-down, followed by several linear feet of high vacuum water removal, is used. This is followed by a "curtain coater" which applies the glass fiber binder.

Advantageously, the present invention can use, as the base substrate, glass fiber mats having a porosity which is too high to be used alone as an underlayment or as a facer in a foam board laminating process. Various examples of types of glass mat substrates suitable for use with the present invention are provided below.

GLASS MAT SUBSTRATES

Glass Mat Substrate Example No. 1

In the course of normal production, glass mat producers sometimes make "off-specification" rolls which are not usable as recycled raw glass fiber because of contamination with the mat binder. The urea-, or phenol-formaldehyde (or other) resin used can cause problems in the non-woven web forming process. This off-specification glass web can be obtained and used as the substrate for the products of this invention. These grades of rejected glass mat include shingle-mat and filter-mat. The porosity of shingle-mat or filter-mat is too high to contain the liquid phase of any thermosetting plastic resin, and too high to resist water penetration needed in an underlayment sheet. It has been discovered that the liquid resin of the foam laminating process will penetrate these porous glass mats, adhere to the equipment, and cause malfunction to the extent of shutting down the machine. This mat is the preferred sheet for this invention due to the low cost and heavy basis weight, which is usually between about 15 and 20 lbs. per thousand square feet (per "MSF").

Glass Mat Substrate Example No. 2

In order to eliminate the micro-glass fibers, or glass dust, one grade of glass mat is produced using a small percentage of cellulose fibers along with the glass fibers. Since cellulose fibers cost less than glass fibers, this mat can be economically obtained and used as the substrate glass mat of the present invention. When uncoated, this glass/cellulose combination mat was tried as a facer mat in a common foam board laminator and failed to contain the organic, foamable liquid. It is not at all resistant to water, and thus when uncoated is unacceptable as an underlayment.

Glass Mat Substrate Example No. 3

One grade of lightweight, highly porous glass mat made on a regular basis is used as a pipe wrap in conjunction with coal tar pitch to protect underground pipes against rust, rodents, and roots. This very porous glass mat is not acceptable as a foam board laminate facer, nor as a building underlayment. However, when coated with the low cost, novel coating of this invention, this low cost mat becomes a valuable product as a facer or as an underlayment.

COATING MIXTURES

Coating Mixture Example No. 1

A 10,000 pound batch of coating mixture is made by adding 1,280 pounds of water to a mixing tank designed as a high speed, high shear disperser; followed by 50 lbs. of Sokalan PA 30 (sodium poly-acrylate dispersing agent); 840 lbs. wet basis (407.4 lbs. dry basis) carboxylated SBR latex; and, 10 lbs. wet basis (5 lbs. dry basis) of 50% caustic. This is well mixed prior to adding 7770 lbs. of 325 mesh ground limestone and 50 lbs. of quicklime while mixing on high speed until the pigment filler is well dispersed. This produces a coating mixture having about 82.5% solids, a density of about 16.2 pounds per gallon, about a 19:1 ratio of filler to dry basis latex, and with a viscosity of about 800 centipoise (cps) at 25° C. Hence, the weight of quicklime added is 0.6%, e.g., at least 0.5%, by weight of the total weight of the coating on a dried weight basis.

Coating Mixture Example No. 2

In the Coating Mixture Example No. 1, an EVCl latex is substituted for the SBR latex, and mixed in the same manner.

Coating Mixture Examples Nos. 3 and 4

In the Coating Mixture Examples Nos. 1 and Number 2, a 325 mesh coating grade clay is substituted for the limestone, and enough extra water is added to reduce the viscosity below about 2000 cps. The solids content of a limestone filler coating is higher than a clay filler coating at the same viscosity.

Coating Mixture Example No. 5

In the coating mixture of Coating Mixture Example No. 2, the amount of limestone added is reduced to 4,800 lbs., the quicklime is eliminated, and 3000 lbs. of ATH added. The naturally occurring aluminum hydroxide contained in commercially available ATH (aluminum tri-hydrate) when it is mixed with water provides a roughly equivalent amount of inorganic binder to this coating mixture as the quicklime provided in previous examples. This particular coating, when applied to a glass fiber mat heavier than 15 lbs. per 1000 Sq. Ft. makes a facer sheet for foam insulation boards which will significantly improve the combustibility resistance of the plastic foam panel.

Coating Mixture Examples Nos. 6 and 7

In Coating Mixture Examples Nos. 1, 3 and 4, the quicklime is reduced to 25 lbs. and 25 lbs. of Portland cement is added.

Coating Mixture Example No. 8

In the Coating Mixture Example No. 1, the quicklime is eliminated and replaced by 50 pounds of 325 mesh limestone. This produces a coating mixture very similar to Coating Example No. 1.

Coating Mixture Example No. 9

As indicated above, in one mode of the invention, a coating composition is substantially void of polymer latex adhesive material, with essentially the sole binder being inorganic adhesive material. A water premix is made in advance by mixing 1280 grams of water with 50.0 grams of Sokalan PA 30 and 10.0 grams of liquid 50% caustic. A 616.8 gram batch of coating mixture is then made by adding 132.0 grams of the water pre-mix to a 1 quart lined paint can, followed by 48.0 grams of lime (i.e., CaO), followed by 436.8 grams of limestone (i.e., $CaCO_3$), using continuous mixing while adding the lime and limestone. This produces a coating mixture having about 78.6% solids, no polymer latex binder, and with a viscosity of about 750 cps at 25 degrees Celsius.

At this point it will be understood by one skilled in the art that literally dozens of examples of suitable combinations of coating mixtures of the present invention can be made.

COATED WEB MATS

Coated Web Mat Example No. 1.

The glass mat substrate of Glass Mat Substrate Example No. 1 is coated on a coater especially designed for porous glass mats. Due to the high porosity of the glass mats used as substrates in the present invention, the aqueous coating mixture comes through the porous mat. If this wet coating comes in contact with machinery parts which are not heated, the parts will quickly become coated and inoperable. Therefore, the coating binder must be substantially dried or cured prior to allowing it to come in contact with machine parts which are at the ambient temperature. In this example, the Coating Mixture Example No. 1 is added at the rate of from about 15 lbs. per thousand square feet (MSF) dry basis weight up to about 120 lbs. per MSF. The optimum cost versus performance range of coating addition rate is from about 20 to about 30 pounds per MFS.

Coated Web Mat Examples Nos. 2 and 3

The Coating Mixture Example No. 8 is added to the Glass Mat Substrate Examples Nos. 2 and 3 to make coated web mats similar to Coated Web Mat Example No. 1, except that these have a lower glass weight and a slightly higher cost. The physical performance of all three of these examples is substantially similar.

Coated Web Mat Example No. 4

The heavier glass mat of Glass Mat Substrate Example No. 1 is coated with a heavy (over 30 lbs. per MSF) coating of Coating Mixture Example No. 5.

At this point it will again be understood to one skilled in the art that literally dozens of examples of suitable combinations of coating mixtures with glass mat substrates of the present invention can be made.

Also, it will be understood by one skilled in the art of coating that a highly porous substrate as used within the scope of this invention will allow an aqueous coating mixture to penetrate to the opposite surface of the porous substrate not contacting the coating roll. Furthermore, a wet mixture on both sides of the substrate would inevitably cause a deposit to build up on machinery parts, requiring a considerable amount of clean-up effort. This problem is overcome by drying the coated substrate sufficiently before it comes in contact with any ambient temperature machinery part of the coater.

The particular ultimate application of the mat, environmental constraints and appropriate product certification criteria, such as fire tests, for example, will influence which combinations of substrates, binders, and fillers should be used for the particular application.

LAMINATES WITH COATED WEB MATS

Laminate Example No. 1

A roll of coated web mat according to Coated Web Mat Example No. 2 is placed on an unwind stand of a Hennecke double belt restricted rise foam laminator system, and threaded into the laminator system for use as an upper facer. A second roll of the same coated mat is likewise prepared to be used as the facer on the opposite face (lower facer) of the finished board. Subsequently a roll of coated web mat according to Coated Web Mat Example No. 3 is placed on the unwind stands for feeding into the laminator.

A prior art urethane modified polyisocyanurate foam formulation is applied in liquid form to the coated mat on the bottom (i.e., the mat from the second roll). Both the liquid formulation and the coated mat are processed continuously. The foam expands in a heated (for curing) portion of the laminator under restrictive pressure. In the laminator system there is no leaking of organic liquid through the facers.

Upon curing, a solid rigid panel 10 leaves the laminator and is cut into desired lengths, typically eight feet long (see FIGS. 1 and 2). The laminate includes a core of hardened thermosetting plastic foam 12, sandwiched between an upper facer 14 and a lower facer 16. The facers 14 and 16 each are comprised of the a mat 18 coated with one of the novel coating compositions 20 of the present invention.

After laminates produced in accordance with Laminate Example No. 1 having a thickness of 0.5 inches were fully cured and cooled, the laminates were subjected to ASTM E-84 testing. The laminates had a Flame Spread Index (FSI) of 25 to 50 and Smoke Developed Ratings (SDR) of 130 to 175. Laminates produced in accordance with Laminate Example No. 1 having a thickness of 2.0 inches had FSI ratings of 55 to 75 and SDRs of 250 to 450.

While the invention has been particularly shown and described with reference to the preferred embodiments thereof, it will be understood by those skilled in the art that various alterations in form and detail may be made therein without departing from the spirit and scope of the invention.

The embodiments of the invention in which an exclusive property or privilege is claimed are defined as follows:

1. A method of producing a mat comprising coating a predominantly glass fiber porous web substrate with a coating, the coating comprising an aqueous mixture of:

(1) at least one mineral pigment;

(2) a first binder material comprised of a polymer latex adhesive material which comprises no more than 5.0% by weight of the total weight of the coating on a dried weight basis; and, (3) a second binder material comprised of an inorganic adhesive material.

2. A method of producing a mat comprising coating a predominantly glass fiber porous web substrate with a coating, the coating comprising an aqueous mixture of:

(1) at least one mineral pigment;

(2) a first binder material comprised of a polymer latex adhesive material; and, (3) a second binder material comprised of an inorganic adhesive material which comprises at least 0.5% by weight of the total weight of the coating on a dried weight basis.

3. The method of claims 1 or 2, wherein said second binder comprises a compound selected from the group consisting of calcium oxide, calcium silicate, portland cement, calcium sulfate, magnesium oxychloride, magnesium oxysulfate, and aluminum hydroxide.

4. The method of claims 1 or 2, wherein said mineral pigment has said second binder material naturally occurring therein.

5. The method of claim 4, wherein said mineral pigment comprises a filler preferably chosen from the group consisting of aluminum trihydrate, calcium carbonate, calcium sulfate, clay, sand, and magnesium oxide containing magnesium chloride or magnesium sulfate.

6. The method of claims 1 or 2, wherein said mineral pigment is preferably chosen from the group consisting of calcium carbonate, clay, sand, mica, talc, calcium sulfate, aluminum trihydrate (ATH), and antimony oxide.

7. The method of claims 1 or 2, wherein said mineral pigment comprises inorganic particles and wherein at least 95% of said particles are sized to pass through a 325 mesh wire screen.

8. The method of claims 1 or 2, wherein the polymer latex adhesive material is any plastic polymer which is capable of being emulsified into an aqueous dispersion.

9. The method of claims 1 or 2, further comprising:

substantially drying the coated mat; and, winding the dried mat into rolls.

10. The method of claim 1 or 2, wherein the ratio by weight of said mineral pigment to said polymer latex adhesive material of said first binder is in excess of 15:1.

11. A mat produced by the method of claim 1.

12. A mat produced by the method of claim 2.

13. A mat produced by the method of claim 3.

14. A mat produced by the method of claim 4.

15. A mat produced by the method of claim 5.

16. A mat produced by the method of claim 6.

17. A mat produced by the method of claim 7.

18. A mat produced by the method of claim 8.

19. A mat produced by the method of claim 9.

20. A mat produced by the method of claim 10.

21. A thermosetting plastic foam laminate comprising a mat produced by the method of claims 1 or 2 with a rigid foam integrally attached upon formation of the foam to a surface of said mat.

22. The laminate of claim 21 wherein there are two parallel mats with said rigid foam formed therebetween.

23. A method of producing a thermosetting plastic foam laminate comprising:

coating a predominantly glass fiber porous web substrate with a coating which comprises an aqueous mixture of:

(1) at least one mineral pigment;

(2) a first binder material comprised of a polymer latex adhesive material; and, (3) a second binder material comprised of an inorganic adhesive material; and, adhering to the substrate a rigid foam formed from a thermosetting plastic.

* * * * *